United States Patent
Tuttle et al.

(10) Patent No.: US 6,785,405 B2
(45) Date of Patent: Aug. 31, 2004

(54) APPARATUS AND METHOD FOR DOCUMENT READING AND AUTHENTICATION

(75) Inventors: William J. Tuttle, Merrimack, NH (US); Theodore T. Kuklinski, Weston, MA (US)

(73) Assignee: AssureTec Systems, Inc., Manchester, NH (US)

( * ) Notice: Subject to any disclaimer, the term of this patent is extended or adjusted under 35 U.S.C. 154(b) by 109 days.

(21) Appl. No.: 10/279,150

(22) Filed: Oct. 23, 2002

(65) Prior Publication Data

US 2004/0081332 A1 Apr. 29, 2004

(51) Int. Cl.[7] .............................................. G06K 9/00
(52) U.S. Cl. ........................ 382/112; 382/135; 382/137; 382/171; 382/209; 340/5.86; 902/7
(58) Field of Search ................................ 382/103, 112, 382/135, 137, 138, 139, 171, 190, 209, 217, 278, 282; 356/71; 902/7; 194/206, 213; 340/5.86

(56) References Cited

U.S. PATENT DOCUMENTS

| | | | | |
|---|---|---|---|---|
| 4,661,983 A | * | 4/1987 | Knop | 382/112 |
| 5,018,767 A | * | 5/1991 | Wicker | 283/67 |
| 5,661,552 A | * | 8/1997 | Nishigai | 356/71 |
| 5,761,089 A | * | 6/1998 | McInerny | 702/128 |
| 6,343,204 B1 | * | 1/2002 | Yang | 399/366 |
| 6,369,169 B1 | * | 4/2002 | Lee et al. | 525/384 |

* cited by examiner

*Primary Examiner*—Bhavesh M. Mehta
*Assistant Examiner*—Yosef Kassa

(57) ABSTRACT

Apparatus and a method are disclosed for reading and authenticating documents. These documents include passports, driver's licenses, identity documents and documents of value, and they are read to obtain and verify information recorded thereon, and to test for and detect security features thereon to determine if such documents are genuine, counterfeit or have been altered. A first image is taken of a document under evaluation and, from the image, the size of the document is determined, and that defines the document as being part of a smaller class of documents having the same size. Reference documents for all documents types are segmented and a correlation number is determined for each segment. A correlation number is determined for each segment of the first document having fixed information, and these correlation numbers are compared with correlation numbers of corresponding segments of the reference documents that have the same size as the first document. The identity of the document is determined from the comparison of the correlation numbers. Using the document identity, a set of security attributes is retrieved and the identified document is tested using the attributes to determine if the document is genuine, counterfeit or has been altered.

22 Claims, 4 Drawing Sheets

APPARATUS AND METHOD FOR DOCUMENT READING AND AUTHENTICATION

FIELD OF THE INVENTION

This invention relates to apparatus and a method for imaging many types of documents, such as passports, identity cards and driver's licenses, to identify the type of document, read the document, and then to detect security information and/or materials used therewith to authenticate such documents and determine if they are valid, counterfeit or have been altered.

BACKGROUND OF THE INVENTION

Illegal modification and counterfeiting of identification documents, such as passports, identity cards and driver's licenses, and documents of value, such as bonds, certificates and negotiable instruments, has been increasing year by year to the concern of companies, governments and their agencies that issue these documents. To counter this problem new materials are being developed for the production of such identity documents and documents of value, that make it more and more difficult to alter or counterfeit the documents, and easier and faster to detect if such documents are counterfeit or have been altered.

These new materials utilize new laminating schemes and materials that use holograms, invisible inks that only appear when illuminated by certain wavelengths of visible or invisible light, retro-reflective layers inside the laminating materials, different types of inks that have one color under normal ambient light but show up as different colors when illuminated by certain wavelengths of invisible light, and many other novel arrangements. In addition, magnetic and radio frequency (RF) taggants may be added to the laminates or base material of documents during their manufacture, and such taggants may be detected while being invisible to the eye. Further, micro-miniature smart chips may be embedded in such documents, such as they are in smart cards, and used in reading and verifying documents such as, but not limited to, those document types listed above.

The increase in number of passports, documents of value, and other security and identification documents having anti-counterfeiting, anti-alteration and other verification features, including new laminating materials, some of which are briefly described above, have created a growing need for new, better document reading and authentication equipment for rapidly and accurately identifying a document type, then reading the document, and verifying if it is authentic by detecting security information about, and/or materials from which the document is made, to detect if it is counterfeit or has been altered.

Such new document reading and authentication equipment is desperately needed at high traffic locations, such as international airports around the world, where millions of travelers pass between countries each year. However, such new equipment is also needed for many other applications such as reading and checking identity badges of employees and others in high security installations where government or industrial confidential or secret information is to be protected, and/or access and movements are carefully limited, controlled and recorded. In addition, such new document reading and authentication equipment is needed to check different types of documents of value.

SUMMARY OF THE INVENTION

The above described need in the art for new, better document reading and authentication equipment is satisfied by the present invention. The new equipment rapidly and accurately identifies a document type, reads the document, and then verifies if it is authentic by detecting security information about, and or materials from which the document is made, to detect if it is counterfeit or has been altered.

The novel document reading and authentication equipment described herein performs multi-level, hierarchical testing of documents through a sequence of determining a document type, and of determining if a document is valid, altered or counterfeit. In operation the equipment first captures a single image of a document under test and determines the physical size of the document. From the document size a number of document types are identified that have the same size as the document under evaluation. A first set of characteristics for each of the identified document types is then retrieved from a memory and is individually compared to the first document image that has already been captured. From this comparison, the specific document type being evaluated is often identified. Sometimes, another level of testing is required to identify a document type.

Reference documents for all document types that can be authenticated are segmented and a correlation number is determined for each segment based on some characteristic in the segment. The first image of the document is also segmented and a correlation number is determined for the same characteristic for each segment containing static or fixed information. The correlation numbers for each document segment having static information are compared with the correlation numbers of corresponding segments of the reference documents that have the same size as the first document. The identity of the document is determined from the comparison of the correlation numbers. Using the document identity, a set of security attributes are retrieved and the identified document is tested to determine if the document is genuine, counterfeit or has been altered.

The results of reading and testing each document are presented to an operator of the document reading and authentication equipment, unless the equipment is operating autonomously. In addition, whether or not the document has not been altered and is not counterfeit, information on the document and about the document type may be used for many other purposes. For example, the information may be stored providing a history of use of the document. Further, other databases may be checked to determine if the bearer of the document is wanted for any reason, should be detained, is temporarily or permanently denied any privilege granted by the document, or for many other reasons. Also, it can be determined what type of document is most commonly used at specific document reading and authentication equipment locations.

More particularly, the new document reading and authentication equipment can cooperate with a central database to store information read off the document, or regarding the use of the document such as a passport, to store a record of the bearer of the passport or other identity document passing through an airport or other location where the passports or other documents must be presented when traveling or moving about, and whether the document bearer is on a government agency or other watch list.

DESCRIPTION OF THE DRAWINGS

The invention will be better understood on reading the following Detailed Description in conjunction with the drawing in which.

DETAILED DESCRIPTION

Throughout this Detailed Description, emphasis is given to reading and verifying a passport 11 (FIG. 1), but it should be remembered that many other types of documents (identity cards, driver's licenses, resident alien green cards, bank books, etc.), and documents of value, such as bonds, certificates, currency, and negotiable instruments, may be read and authenticated with the novel new document reading and authentication equipment 10. While identity documents are usually laminated, other document types, such as documents of value are usually not laminated but may implement security features which may be read and verified using the novel document reading and authentication equipment 10 disclosed and claimed herein.

Figure 1:
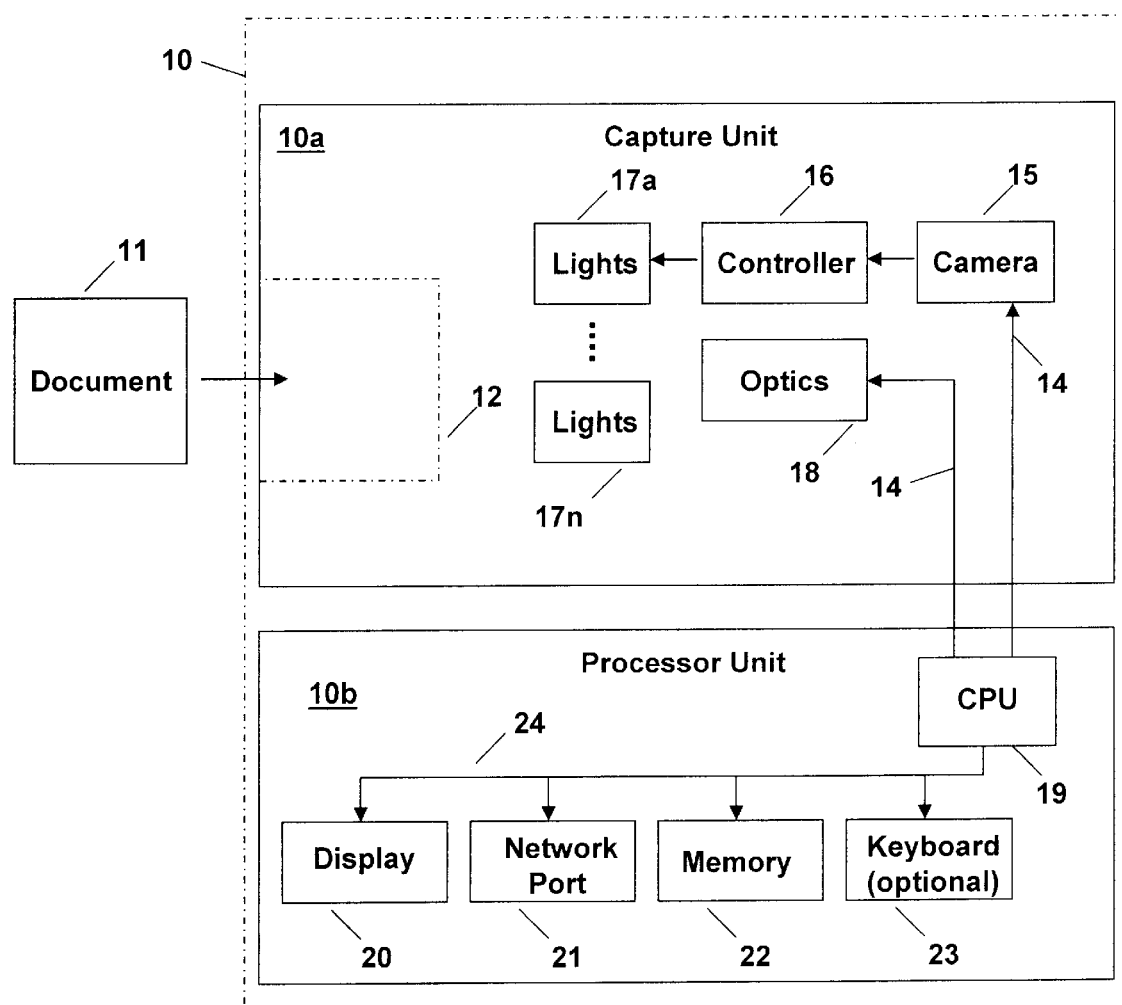
FIG. 1 shows a block diagram of the novel apparatus for the document reading and authentication equipment.

The preferred embodiment of the document reading and authentication equipment 10, shown in FIG. 1 and described herein, can read alphanumeric text, different types of barcodes, and other types of information imprinted on passports and other types of documents in specific areas and verify the inscribed information, including against an information database. In addition, the reading and authentication equipment 10 can store the information read off a passport or other document in a central database as a record of the bearer of the passport or other document passing through an airport or other location where passports or other documents must be presented when traveling. Several other examples of documents that can be read and identified are visas, identity cards, driver licenses, and alien residence cards.

The novel document reading and authentication equipment disclosed herein can also retrieve photographic and other information, which may include, but is not limited to, encoded biometric information of fingerprints, voice prints, and retinal scans (eyeprints), recorded on a passport or other identity document, and then compare these to information stored in databases or to the bearer of the passport or other document. Such biometric information can be encrypted and stored in two dimensional bar codes or by other means on identity documents. The novel document reader verifier can compare in real time such biometric information recorded on a passport or other document with the output of readers, such as fingerprint and eye readers separate from, but connected to, the novel reader verifier described and claimed herein, taken at the time when a passport or other document is being imaged, read, and verified to authenticate that the document is being carried or presented by the person to whom it was issued. In addition, digitized photos may be printed directly on or in the base material of such identity documents, and the above mentioned biometric and other information may be invisibly embedded into bits of such digitized photos.

Further, the picture on an identity document 11 can be automatically compared with photos in a watch list, such as generated by Interpol, using facial matching algorithms, to see if the bearer of such an identity document is on such a watch list and should stopped and/or questioned.

In FIG. 1 is shown a block diagram of the novel document reading and authentication equipment 10. Equipment 10 typically comprises two pieces, a capture unit 10a and a processor unit 10b that are separate but connected by electrical cables 14. However, they can both be located in the same box. Alternatively, the cable could be replaced by a wireless connection. Equipment 10 has a CPU 19 in processor unit 10b operating under control of a program stored in memory 22 to identify, read and authenticate documents of all types such as, but not limited to, passports, identity cards and driver's licenses. Capture unit 10a has a slot or opening 12 into which a document 11 is inserted. The size and shape of opening 12 may be changed to accommodate different types of identification documents and documents of value, depending upon specific applications of the equipment. As previously mentioned, the following description uses the example of a passport as the document being identified, read and authenticated. On the inside page of a passport is located a photograph, bibliographic and possibly other information about the bearer of the passport. This information includes passport number, issuance and expiration dates, issuing authority, and may include biometric information about the person to whom the passport 11 is issued, and other information. See International Civil Aviation Organization (ICAO) specification 9303, Part 1, entitled "Machine Readable Passports" for more details regarding the requirements of passports. See also the other Parts of this specification regarding the requirements for other types of documents.

As the laminated first page of a document (passport) 11, on which is the photograph and other information regarding the person to whom the passport is issued, is inserted into slot/opening 12, upon being fully inserted into slot 12 its presence is sensed by CPU 19 detecting a change in the video output from camera 15. To do this, light 17a providing an infrared light output is enabled until a document 11 is inserted into slot 12 and a first image is captured by camera 15. In other embodiments an electromechanical switch or a photo sensor may be used to detect the presence of a document. Also, light of other wavelengths, or a balanced white light, may be used to detect the presence of a document and to capture the first image.

Figure 2:
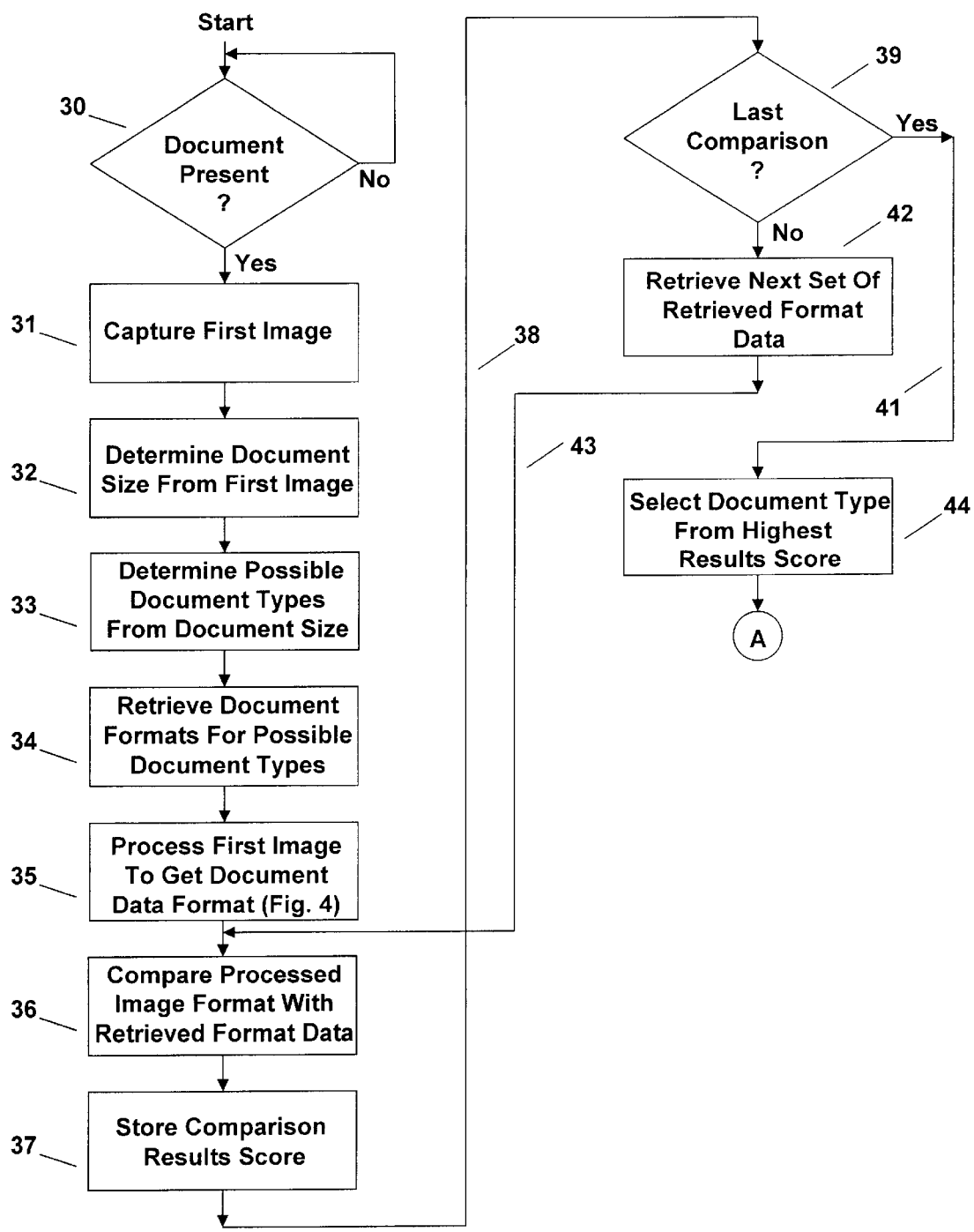
FIG. 2 is a block diagram of the operation of the document reading and authentication equipment under control of a stored program operating in a processor therein to identify the type of a document being checked.
Figure 3:
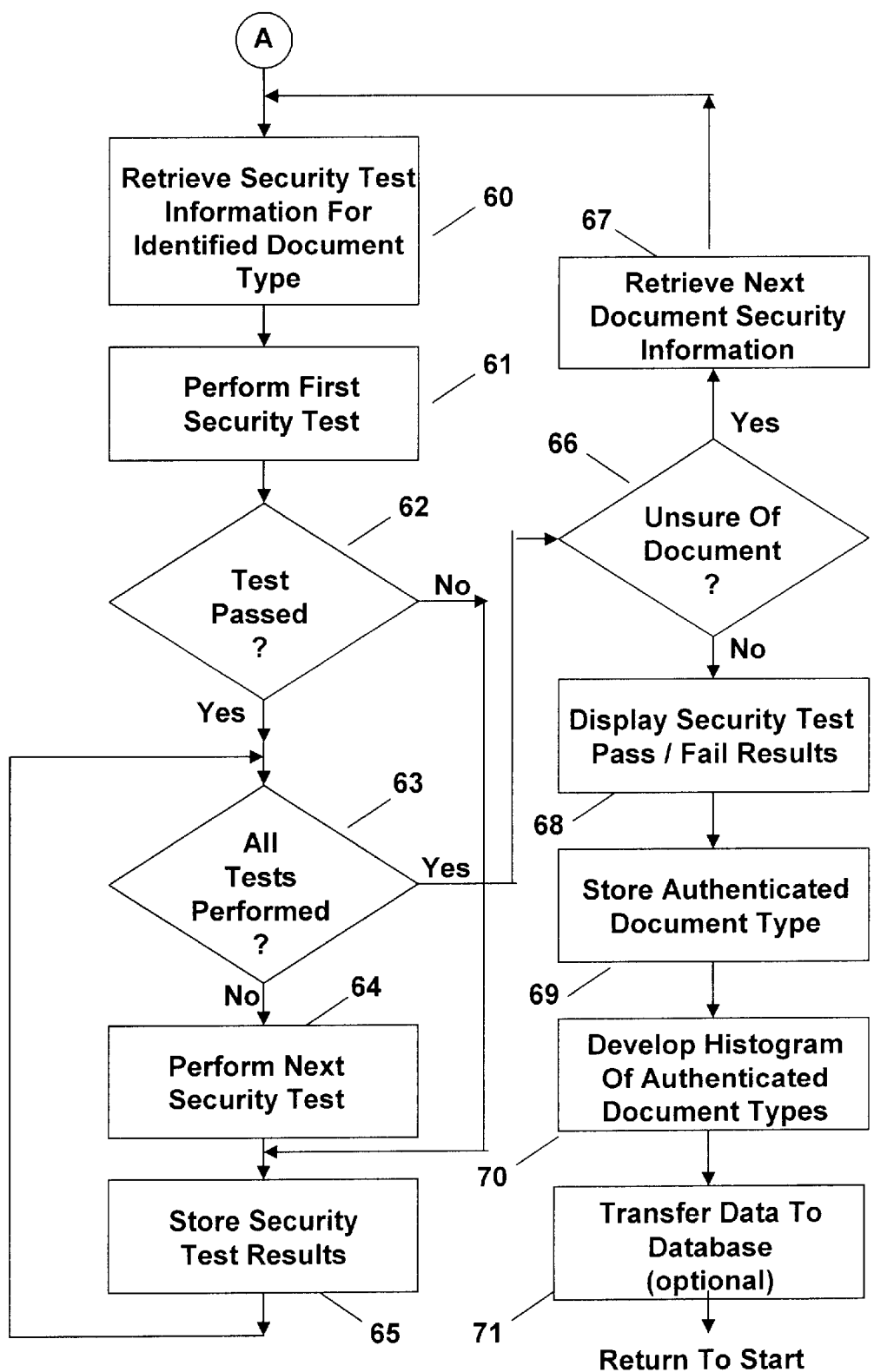
FIG. 3 is a block diagram of the operation of the document reading and authentication equipment under control of a stored program operating in a processor therein to authenticate a document being checked.
Figure 4:
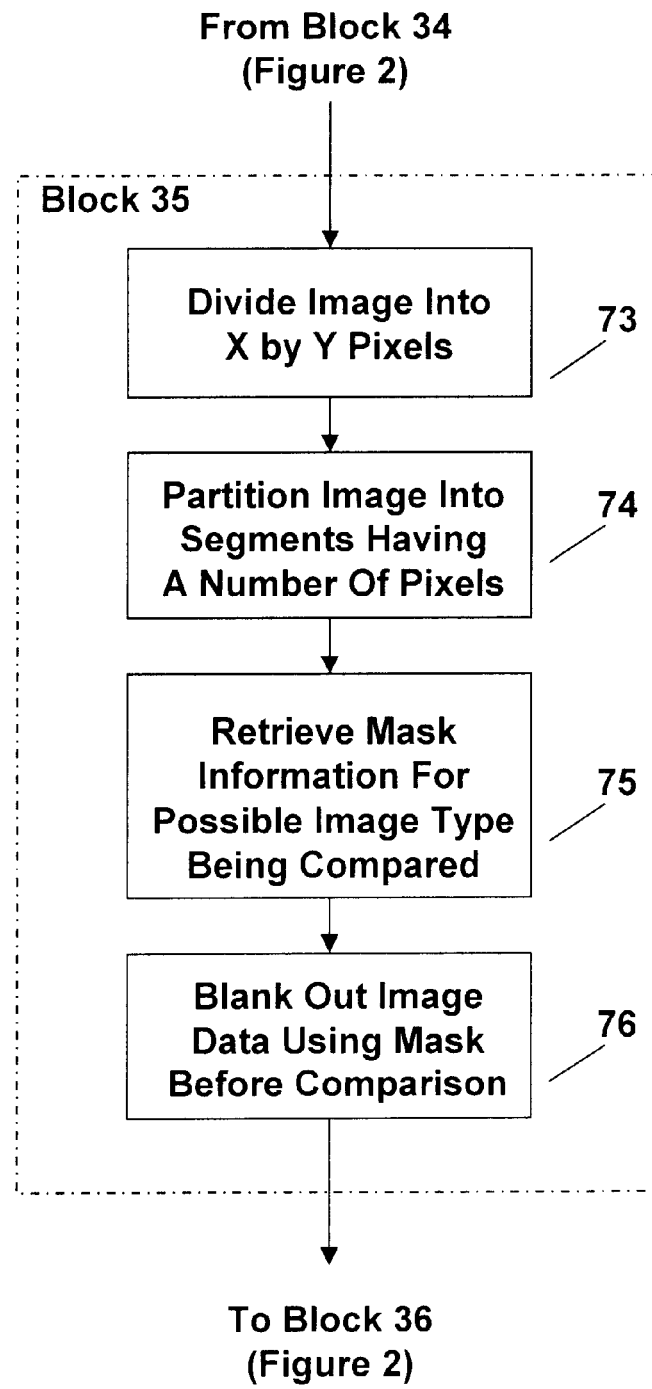
FIG. 4 is a block diagram expanding the operation of a block shown in FIG. 2.

Upon detecting the presence of a document, CPU 19 takes the first image of the document 11 to determine the size thereof. Size is used as the first factor in determining the type of document that is inserted into document reading and authentication equipment 10. Described hereinafter with reference to FIGS. 2–4 is a description of how a document type is first identified and an the identified document is then authenticated to determine if it is valid, or has been altered, or is counterfeit.

Block 10 is divided into 10a and 10b sections indicating only that camera 15 and its associated components 16 and 17, and optics 18, may be physically located separately from the electronic components 19–23.

Central processor unit (CPU) 19 controls the operation of the equipment 10 and its document identification, reading and authentication functions. In addition, equipment 10 may be connected via bus 24 to network port 21, and thence to a central computer (not shown) managing a database to store information read from verified documents, and to check if the bearer of the passport or document is wanted for any reason, should be detained, is temporarily or permanently denied any privilege granted by the document, or for many other reasons.

There is a plurality of light sources 17a–17n associated with camera 15 that are selected by CPU 19 via camera controller 16. These light sources may include white light, infrared, ultraviolet, pulsed and colored lights as needed to read and analyze documents. In operation CPU 19 initially sends a signal to energize only light source 17a, comprised of LED's or other light sources, to provide infrared (IR) light. The (IR) light from light source 17a is reflected from passport 11 in slot 12 and impinges on camera 15 via optics 18. Camera 15 captures a first image of document 11 and stores it in memory 22. That first image contains pictures, text and all other forms of information on the face of document 11 that has been inserted into slot 12. There are other light sources 17b–17n that are subsequently energized, only as needed, for testing and determining document authentication as described further in this specification.

Document reading and authentication equipment 10 also includes a display 20 for providing a visual feedback to the operator of equipment 10 of the results of reading and authenticating a document 11. The display 20 may consist of individual LED's or a monitor, as deemed necessary, to provide a visual output to the operator of equipment 10. There may be multiple displays, such as one for the operator and one for the subject whose document is being examined. There is also an optional keyboard 23 that may be provided and used by an operator of equipment 10 to provide manual input commands to equipment 10.

CPU 19, under control of the program stored in memory 22, next analyzes the first document image stored in memory 20 as described in detail hereinafter with reference to FIGS. 2–4 to first identify the type of document, and then to read and authenticate the document to determine if it is valid, or if document has been altered or is counterfeit. During document authentication, others of lights 17a–17n are energized, only as necessary, to capture subsequent images only as required for verification/authentication of a document.

Before continuing with a description of FIG. 2, a description is given of the methodology used to identify document types.

An image bitmap is obtained from a camera, scanner, or a file source and can be in grayscale, color or binary format. The grayscale format typically comprises 8 bit bytes representing 256 gray levels. The color format typically comprises 24 bit bytes comprising three 8 bit bytes each representing one of the primary colors red, green and blue. The binary format comprises 1 bit with two levels (0 and 1), representing black and white. Throughout this detailed description it will be assumed that for an 8 bit grayscale bitmap, having values between 0 and 255, 0 represents a black level and 255 represents the maximum white level. For a color image the 256 values of each 8 bit byte represent the red, green and blue (RGB) values that can be associated with each color pixel. In addition, other representations of an image may also be used. For instance for each color pixel value, color may alternatively be represented by hue, luminance, and saturation.

An image bitmap can be considered a rectangular array of pixels comprising "H" rows and "W" columns. An image bitmap will contain H×W pixels. However, for a task such as document matching, the focus is more on macro detail than micro detail such as the individual pixels making up an image. Typically, a document image will have different characteristics in different regions of the document. Thus, it makes sense to break a larger image into a number of smaller sub-images. An image bitmap can be broken up into a grid of sub-regions or segments that comprise "R" rows and "C" columns. Each of these segments is itself an image from which characteristics can be derived, just as they can be for the entire image. Each segment image will thus be H times R pixels high and W times C pixels wide. Segments are described here as a matrix of rectangular sub-images but there is no requirement that they be.

Each of the segments can have some features or measures associated with it that typically will vary from document to document. In the case of a gray scale image, this could be the average luminance, a measure of how bright or dark a segment is. For an 8 bit grayscale image, a luminance number between 0 (black) and 255 (white) can be used to describe the contents of the segment.

Each segment has many other possible properties that can be used to characterize it. Any image characteristic that can be associated with a given pixel location can be used with the methodology described herein. For example, hue, saturation, red, green or blue components may be used. Certain measures can be done over a segment area to characterize it, such as Fourier analysis and statistical measures. For instance, the standard deviation of the gray value might give an indication of the variability of the luminance content in a segment. A low standard deviation would indicate a more solid luminance within the particular segment. Various types of image processing filters or operations may also be applied. For instance, the count of horizontal or vertical edge transitions might be used to determine highly variable segments.

The measures associated with each segment of a reference image can be stored in a database. The reference image itself need not be necessarily be referenced in the matching process, just the feature representation of the image after undergoing the segmentation process.

An extension of the segmentation method involves the idea of overlapping segments. The derived feature information in a segment might reflect not just the sub-image defined by the boundaries of the segment but may also reflect information obtained from a larger area. This in effect creates overlapping segments. An alternate way to achieve this is to do some averaging or smoothing of the properties between adjacent segments. The property or measure in a given segment may in fact be a weighted average of the raw measure in the given segment along with the property or measures from neighboring segments. Typically, the information from neighboring segments is weighted less.

Document matching is essentially a process of comparing attributes from one image bitmap against those from a reference image bitmap and deriving some degree of match or similarity. The degree of match can be expressed on many scales. For the purposes of this description, a match score of 1.0 is used to represent a perfect match and 0.0 to represent a certainty of no match.

The document identification process consists of performing a basic search for the best match between the image of an unknown document and a reference set of images of known documents. This is done by calculating a match score between 0 and 1.0 for the unknown document versus each of the known document images in the reference set. The known document of the reference set with the best match score, if above some rejection threshold, is considered to be the matching document type.

How these document matching numbers are derived can be done by any number of methods. For example, to calculate a match score, the difference between each segment in the unknown document image, and the corresponding segments of the known document images in the reference set can be obtained. These differences can be summed and normalized in some manner, such as sum of squared difference, or simple difference. A match score of 1.0 corresponds to an exact match between the two images. A match score of 0.0 corresponds to a score reflecting the maximum possible difference score between two images, or no match.

Using this segmentation approach has the advantage of being able to compare disparate image bitmaps. Bitmaps may be of different sizes in pixel height or width or even stretched. A comparison match score can still be done since all images can be normalized to the same segment matrix.

In a document, there are typically areas that are preprinted with fixed information such as the name of the issuing authority, such as a state or government agency. This fixed information we term "static" information. There are other areas on a document that may contain information that is highly variable in content, which we term "dynamic" information. For example, a photograph will be fairly fixed in its location on a document type but the color content of the image may vary a lot from photo to photo. There may be information fields that are sometimes present and sometimes absent. On driver's licenses, for instance, an indication of whether or not the person is an organ donor may fall into the "dynamic" category. There are other areas, such as a name field, which may only vary slightly in position but will vary in length due to names being of different lengths. Depending on the type of measures or features employed, these fields might be considered "static" or "dynamic".

When it is desired to determine a matching score between two images, an unknown document image and a member of a pre-stored set of known document images, there will be some calculations or measures performed using corresponding segment members. The concept of masking allows us to ignore those areas of the images that are considered to contain "dynamic" information, while focusing on comparing those segments that correspond to image areas that contain "static" information from document to document within a particular document type.

One way of implementing this is with a segment matrix of the same size as that used to segment the portion of an image that is in the segment. The mask matrix might contain all 0's in those segments which are to be ignored in the comparison, and contain all 1's in those segments which are to be used for the matching determination.

All images in the pre-stored set of known document images have measurements stored in a database that have been derived using a mask defined for those images. When doing a comparison of an unknown document image to an image of a known document belonging to a set, the unknown document image is hypothesized (the null hypothesis) to be of the same document type as the image in the known document image set, and the matrix that has been defined for a set element is applied to the unknown document image. The measurements from the unknown image that are used will vary with each element of the set.

The measurements for the known document set elements in the database need only be done once. The measurements for the individual segments in the unknown document images need only be done once. It is just that their use is customized for each of the elements of the known document images in the set.

The case where an image of an unknown document may be captured upside down is a common one. It is quite easy in many cases to insert a driver's license document rotated 180 degrees from the orientation it should be inserted. It is not necessary to have a template in the known document database set which corresponds to the rotated image. The unknown document image is segmented and a segment matrix of measurements is generated. First, the image is masked and compared with each unknown document image to get a match score. Using standard techniques, the raw segment matrix is then rotated. A mask is then reapplied and a match score is again obtained.

In the case of a simple binary (use/don't use) masking approach, a given segment is included or not included in an overall matching comparison process. In this approach, a mask may be viewed as a matrix of values of the same R times C dimensions as the image segmentation matrix. In the case of binary masking, each mask segment may have a value of 0 or 1. A value of 0 might represent the fact that the corresponding image segment is not used for matching while a value of 1 might indicate that the corresponding image segment is to be used in the matching process.

The concept of masking can be extended from the simple binary (use/don't use) masking approach described in the previous paragraph. When comparing unknown and known documents, there may be some segment areas of the document that are more important than others. These segment areas can be weighted higher when computing an overall score. This could be reflected in the matrix by using positive numerical values in the matrix segments. The number 1.0 can reflect the normal weighting while a higher number can reflect more emphasis on a given area. The matrix segment numbers used do not necessarily need to be integers but certainly can be.

Likewise, there are other areas in a document image that we might expect to be highly variable, while others are not so variable. Rather than simply ignoring these highly variable "dynamic" areas, they can possibly be indicated with negative numbers in the segment matrix. The effect of this will be to boost the matching score if the reference and the unknown segment do not match since this would be the expected result. If the corresponding sections differ, this indicates a better match.

There could also be different masks that are applied for different measures. It is also logical to use different masks for images that are obtained using different lighting sources. The segment areas that are "static" or "dynamic" in a document infrared (IR) image may be quite different than those in the visible image.

A histogram is an indication of the relative frequency of different levels or colors within an image. A gray scale histogram can be represented by a series of bins corresponding to the number of possible gray values. For an 8 bit gray scale image, there will be 256 histogram bins ($2^8$).

Adjacent bins can be combined. For instance, instead of 256 bins, there might be only 8 bins (256/32), each the result of combining the results from 32 adjacent bins. The total number of elements in a histogram will equal the number of pixels.

Because different images may be different sizes, the number of pixels (H times W) will vary with the image size. In order to compare two histograms for matching purposes, it is necessary to normalize them in some manner. One method would be to replace the raw counts in each bin with a fraction between 0.0 and 1.0 of the total count that the bin represents.

Fraction=(Count in Bin)/(Total Count)

Images of different sizes, or those captured on different equipment, can thus be compared. A simple matching process can be done by measuring the total difference between corresponding bins for two separate images. No difference will correspond to a matching score of 1.0 and visa versa. It is notable that the overall histogram remains the same even if the image is rotated 90, 180, or 270 degrees.

Histogram matching can easily fit into the segmented image approach. For each of the R×C sub-image segment, a histogram process is performed, typically with combined segments, and the "segment histogram" is stored in a memory. The raw histogram for the entire image can be derived from the segment histograms by simply adding up the corresponding bins. The segment histograms are computed only once.

The desire is to compare the overall histogram for the unknown document with the histograms of a set of pre-stored known document images to find the best match. An overall histogram of each of these pre-stored known document images has already been computed and stored in a database. This histogram was based on including only "static" areas of the document and excluding "dynamic" areas based on a mask that excludes segments corresponding to dynamic document information. One approach is to set all the pixels in a masked area to a gray value of 0 representing black. The mask is stored in the database along with the derived histogram.

When a comparison is made between the unknown document image and one of the prestored known document images, the pre-stored image's mask is applied to the unknown image and an overall image histogram is calculated from the segment histograms. The derived histogram for the unknown document is compared with the histogram of the pre-stored known document image to derive a comparison score. By doing the segment histograms with a mask application, a customized unknown histogram is derived easily for comparison to the pre-stored image histograms.

Rather than doing a matching comparison using an entire array of segments, in some circumstances, much of the information can be derived from using horizontal or vertical projections of the segment information. In many cases, looking at the horizontal and/or vertical projections is sufficient to distinguish between document images. A macro comparison using R rows by C columns would involve comparing R×C pairs of measures. A comparison of horizontal projections requires only C and using vertical projections an additional R. R, C, or R+C calculations is preferable to R×C. In addition, the storage requirements are much less for the pre-stored measures.

Consider the case of R×C segments each containing an average gray value for the segment as a typical measure. The horizontal projection of C values is obtained by simply averaging each of the R segment rows at each of the C segment columns. The vertical projection of R values is obtained by averaging each of the C columns at each of the R rows.

Masking is easily applied to the segment matrix. The masked segments are ignored in the calculation or simply given a fixed value, such as zero. A horizontal projection from the unknown image can be compared with the masked horizontal projection from one of the prestored images to yield a matching score. The same could be done for a vertical projection.

Document images can be derived from visible light sources or from alternate lighting sources, such as infrared (IR) or ultraviolet (UV). Images obtained using each lighting source can be analyzed in the manner previously described and the results combined to give a composite document matching score. Two documents that may appear almost identical in the visible spectrum may be quite different in characteristics when measured in the IR or UV spectra.

The process described for a single light source image can also be used to process images from multiple light sources. That is, matching can be done based on a combined matching score from matching the visible with visible template, IR with IR template, UV with UV template, and so on.

To arrive at an overall match score, the individual match scores for different measures can be combined. These different match scores can be weighted differently in arriving at a combined match score.

Another method which can improve performance is to analyze multiple images from the same source. With a video camera based scanner, multiple sequential images can easily be obtained and analyzed independently or by combining them or their derived information. The alternate lighting image matching can be used as a form of verification.

All known documents that are stored in the database need not be compared to an unknown document. For example, a driver's license sized document need not be compared using the templates for passport size documents. Depending on initial measurements, such as the size of a document, a candidate list of known documents to be compared can be generated which is less than all the known document types in the database.

Once a match score is generated there are several strategies that can be used. First, the matching process can be terminated when a sufficiently good match is obtained. The document type identified by the matching process would then undergo a verification process.

Second, matching can be done for all known document types that match the size of the unknown document. The matching scores obtained can be ordered by their value. Starting with the identified document type having the best score, the unknown document is checked to see if it meets verification criteria for the identified document type. If it does not meet the verification criteria, the unknown document is then checked to see if it meets verification criteria for the identified document type having the next best score, and so on.

FIG. 2 is a block diagram of the operation of document reading and authentication equipment 10 under control of a program stored in memory 22 and operating in CPU 19 to identify the type of a document being checked.

FIG. 2, the stored program is started when equipment 10 is energized, but remains at block 30 until CPU 19 detects a change in the image output from camera 16 indicating that a document has been inserted into reader 10. At block 30 the program periodically determines if a document is present in slot 12 by detecting a change in the image output from camera 15. If no document is present in slot 12 the program continuously cycles back to the input of block 30. When a document 11 is determined to be present in slot 12 the program progresses to block 31 where the first image of the document 11 in slot 12 is captured by camera 15 and stored in memory 22 as previously described.

At block 32, the program processes the stored first image to determine the physical size of document 11 under evaluation. Document size is determined by looking for the first transitions in the stored first image that are spaced from edges of the overall image. These transitions define the outer edges of the document represented in the image. By counting the number of pixels from the edge to the transition points across the document image, its size is known.

Also stored in memory 22 is a list of attributes about each type of document 11 that can be read and verified by equipment 10. Amongst these attributes is the physical size of each such document. At block 33 the program searches the stored document attributes to determine each document type that has the same physical size as document 11.

In the event that a document 11 is inserted into slot 12 rotated ninety degrees from the direction in which it should be inserted, the physical size of the document initially determined from the first image will not match size of any document in the aforementioned list of attributes about each document type. Using one of the many transposition algorithms known in the prior art, CPU 19 rotates the first image ninety degrees and again performs the step at block 32. Likewise, the system could handle a document that was rotated by 180 degrees. If there is still no match, an indication of the problem is provided on display 20.

At block 34, a second set of attributes for each of the document types identified at block 33 are retrieved from memory 22. This second set of attributes includes the type of information located at specific locations on each type of document that can be identified, read and authenticated by equipment 10. More specifically, this second set of attributes indicates locations where "static" information is located on each type of document. An example of such "static" information is the name of a state and the location at which the name of the state appears on driver's licenses and government issued identity cards. Another example of such "static" information is the location of the Machine Readable Zone (MRZ) area on passports and certain information therein. If MRZ data is detected, CPU 19 uses an optical character reading (OCR) program to "read" the alphanumeric MRZ. By analyzing information in the MRZ field, CPU 19 is able to determine if the document is a passport, or another type of document that includes an MRZ field. Such MRZ information also includes, but is not limited to "dynamic" information such as the name, birthday, sex, place of birth of the person to whom the passport is issued, the issuing authority, the date of issuance and expiration of the passport, the issue run, and the passport number.

Information such as the name, birth date, etc. of the bearer of a document 11 is "dynamic" information on the document. The location of such "dynamic" information is known for each document type and is ignored during document type identification processing by using a mask to block it out while permitting "static" information to be read.

The program then progresses to block 35 where the program further processes the stored first image to divide the image into a number of pixels and a smaller number of segments each comprising a number of the pixels. It is these pixels and segments that are used by the computer to go to specific locations on the subject document, identified by the additional attributes, to look for "static" information to be compared to retrieved "static" information for the possible document types having the same physical size as the subject document under evaluation. Since a state may issue driver's licenses and identity cards of the same size and having the name of the state ("static" information) in the same location (also "static" information) on both documents, both types of documents will be of the document types being considered. The location of "dynamic" information on each document type is masked out so that information is ignored during document type identification processing. This processing is described hereinafter with greater detail with reference to FIG. 4.

At block 36 the second set of attributes for the first retrieved document type is compared to the information contained on the subject document to determine if there is a match. The result of each "static" information comparison is assigned a comparison result which is a number ranging between 0 and 1.0 and, after all individual static information comparisons for the first document type are completed, the individual comparison results are combined to yield a comparison result in the same number range of 0 to 1.0. That overall comparison result is stored at block 37. How this comparison result is determined is described to a greater degree further in this detailed description.

In the event that a document 11 is inserted into slot 12 rotated one-hundred eighty degrees from the orientation in which it should be inserted, there is no match found between the additional retrieved attributes and anything found on the document. Using one of the many transposition algorithms known in the prior art, CPU 19 rotates the first image one-hundred eighty degrees and again performs the step at block 36. If there is still no match an indication of the problem is provides on display 20.

The numerical result for each comparison result ranges between 0 and 1.0 because, in reality, there may often be errors resulting from the different comparisons in the comparison process. For example, a state may issue a new series of identity cards on which one bit of static information is relocated to a new position on a document and this change has not yet been entered into the attribute database in equipment 10. In addition, the plastic surface of a laminated driver's license or identity card may be abraded on some portion or all of the plastic laminate protecting the document and, as a result, the first image does not yield a clear indication of the "static" information on the subject document and errors are made in the comparison process. Thus, there is a need to compare all the static information attributes for all the document types retrieved with those of document 11 based on document size.

Stated another way, as the "static" information on the subject document 11 is compared to the retrieved information, the comparison may yield less than an absolute affirmation of comparison. Each static information comparison is assigned a comparison result, which is a number ranging between 0 and 1.0, and all individual comparison results are combined to yield a comparison result in the same number range, 0 to 1.0, for each document type. This occurs because the "static" information of document 11 is basically compared to the "static" retrieved information for each document type on a pixel by pixel (or pixel-based segment) basis and there are always pixels that do not match, thus yielding a figure of merit or number between 0 and 1.0 indicating how close a match there is with all pixels, with 1.0 indicating a perfect match. This is an overly simplified description of the comparison process, which may also be done but is computer processing intensive, and more detail is given further in this detailed description of the actual comparison process which simplifies the comparison process.

For a simple example, in a specific location on a driver's license or identity card is the identity of the state that issued the document. If the document size check indicates that the document is a driver's license or identity card, the program goes to the specific location and reads, for example, "New Hampshire" using optical character recognition (OCR) technology. The program then compares the words "New Hampshire" with the stored words corresponding to the same specific location for the first retrieved document type. If there is a match, the subject document is most likely either a New Hampshire driver license or identity card and the numerical comparison result for this individual comparison test is 1.0. All other driver's license or identity card document types are then ignored. Thus, additional "static" information on the subject document and the two retrieved document types for New Hampshire must be compared to determine if the subject document is a driver's license or an identity card. These individual comparison result numbers for each "static" information area on a document are mathematically combined to yield a comparison result for the first document type that is stored at block 37. For example, the comparison of the static information in a first area on a document with the corresponding stored information may yield 1.0 for a perfect match, the comparison of the static information in a second area of the document may yield 0.8, and the comparison of the static information in a third area of the document may yield 0.9, and the overall comparison result for the document is thus 0.9.

At decision block 39 it is determined whether or not all the sets of retrieved attribute information for all identified possible document types have been compared to the imaged attribute areas on the subject document. When the decision is No, the program progresses to block 42 to retrieve the attribute information for the next possible document type. The program then returns to block 36 to compare each of the newly retrieved attributes with those actually on the subject document as previously described with reference to block 36. The numerical results of the individual comparisons are again combined to yield a comparison result that is a number 0 and 1.0 and is again stored at block 37.

The program again returns to decision block 39 and cycles back to block 36 if all document type comparisons have not been completed. When all document type comparisons have been completed, the program instead exits decision block 39 at Yes and progresses to block 44. At block 44 the document type having the highest, stored comparison result is assumed to be the identity of the subject document, unless the highest comparison result falls below a preset threshold comparison value level such as 0.7.

In the description of testing of documents for security features hereinafter for FIG. 3, it is described for block 70 how a histogram is developed for authenticated document types. At each location where the equipment 10 is located, this historical knowledge is used to help identify a document type, especially when comparison results for two possible document types are the same or very close to each other. If the comparison results for two possible document types are the same, or within a predefined range of closeness, at block 44, the selected document type for initial security testing in FIG. 3 will be that document type that is read and authenticated most often by the particular piece of equipment 10.

FIG. 3 is a block diagram of the operation of document reading and authentication equipment 10 to authenticate a document 11 that has been identified as to document type in the process described in FIG. 2. After a specific document type has been identified, the program progresses via (A) in FIG. 2 to block 60 in FIG. 3 where the particular security tests to be performed on document 11 are retrieved from memory 22. These security tests will indicate whether document 11 is valid, counterfeit, or has been altered. The program then progresses to block 61 where the first of the security tests are performed. The order in which tests should be performed is determined ahead of time and is built into the program.

Many of the tests involve wavelengths of different light, different intensity and illuminate the document at specific low angles to the surface of the document. In making these new tests on document 11, CPU 19 may cause additional ones of lights 17a–17n to be energized, depending on the identified document type, and tests to be performed as indicated by the retrieved document characteristics. Lights 17a–17n include, but are not limited to, white light, long and short wave ultraviolet light, near infrared (IR) light, coaxial light, and blue light. Additional types of lighting may be added as required to test documents.

Hereinafter, the term "direct" light source throughout this detailed description, refers to a light source where the light reflected from a document travels parallel to the incident light illuminating the document. The term "indirect" light source refers to incident light that travels a path different than the reflected light.

For example, "indirect" infrared (IR) lighting will reflect from and make visible certain black inks made with carbon black, but will not reflect from other black inks or black sections reproduced photographically, even though there is no difference to the unaided eye between these black inks. The text printed on a passport is generally in black, but predetermined items on the passport will usually be printed with the special carbon black based black inks. When illuminated with the indirect IR source, this latter printing will appear, while all other printing disappears. CPU 19 knows where to look in an image made under illumination of the indirect IR source for the carbon black ink printing from information in the stored attributes. If the carbon black ink images are in the specified areas, whether they be alphanumeric text or certain patterns or images, they will be identified by CPU 19 as one indication that the passport 11 in document reader 10 has not been altered and is not counterfeit. This is not an absolute verification because other areas on the passport may be altered without touching the carbon black ink printing in the predetermined areas. Other verification tests, as described hereinafter, help to provide a more certain verification whether or not passport 11 has or has not been altered or is counterfeit.

In addition, when "direct" near infrared (IR) light is required, it is applied through a fiber optic cable from light emitting diodes to emulate a point source of light and illuminate the laminated page of a passport. Such illumination is done coaxially with the path the reflected light travels to camera 15. Camera 15 has an operational frequency range that is able to image near and far infrared (IR—to 1000 nm), and long and short wave ultraviolet (UV). This "direct" IR illumination is not affected by normal scuff marks and scratches, fingerprints and dirt on the surface of the laminate. When 3M's Confirm® laminate material is illuminated with direct IR light the image captured is a continuous gray and any logo does not appear. It looks like a clean, gray slate. The continuous gray is easily detected as an indication of the presence of the Confirm® material. Any alterations to and tampering with the Confirm® laminate appear as black marks on the gray background and are easily detected. Further, at increased power levels, the direct IR illumination is reflected from the bottom surface of the laminate, or the surface of the passport page which is laminated, in a manner that reveals the use of unauthorized laminates, and alterations to the laminate.

In addition, IR and blue light LED's are pulsed to achieve higher peak power levels that provide greater illumination of a passport and help to expose security markings and unauthorized alterations at different levels within the passport. The frequency of pulsing the IR and blue light LED's is high enough that the pulsing cannot be detected by camera 15.

When an "indirect" long wave ultraviolet (UV) light source is used, it causes certain inks to fluoresce, so they appear in the image captured by camera 15 using this light source, while all other printing made with other inks disappears. The indirect short wave ultraviolet (UV) causes other, special inks to fluoresce, while all other printing disappears, including that printing made with inks that fluoresce under long wave UV. In addition, alphanumeric characters and symbols may be printed on passport 11 or other documents with inks that are not visible to the human eye, but which appear when illuminated with the UV light source. These symbols may be printed on the paper of the passport which is laminated, or may be imprinted in or on the laminating material. From the attribute and anti-counterfeiting libraries, information about the document type is read out and CPU 19 knows where to look in the digitized video image for the symbols that appear when illuminated under the UV light source. Some of these symbols may only be seen with a direct UV or IR light source and not by indirect UV or IR light sources.

Another direct light source to be utilized is a blue light source generated by an array of blue light emitting diodes (LED's), and is specifically used to verify that 3M's retroreflective Confirm® material is used as the laminate, and has not been tampered with. Under this blue light, a logo is seen against a gray background. This is easily detected. Such logos are combinations of words and graphics that are distinctive to the country or issuer of the passport or other type of document and are compared to the information stored regarding attributes of the document type. The logo is invisible to the unaided eye. Any attempts to tamper with the laminate, or to use another laminate, are obvious under this direct blue light illumination.

A piece of thin plastic is often laminated to the surface of the inside of the front cover or another page of a passport, or over an identity document or driver's license, to seal the photograph and information recorded thereon. This is done to prevent altering the passport, identity document or driver's license. These plastic laminates sometimes consist of special security laminates such as 3M's Confirm® security laminate that has invisible images therein. Another security laminate utilizes retroreflective glass microspheres. The presence, or lack thereof, of these security laminates, or if the base document material has been altered, can be detected even if the alterations cannot be seen. Even if valid security laminates are used, under other wavelengths of visible and invisible light, any attempted or actual alterations to the laminated document clearly stand out and are easily detected by equipment 10.

Other security measures include affixing holographic seals, and the use of special inks such as carbon based inks used to record information thereon in predetermined places, such as in the MRZ area of a passport, to appear when indirect IR lighting is used to illuminate document 11. These special inks may also be magnetic or have other properties that are not apparent, but which are detectable. Still further, special paper may be used, which has subdued background patterns that are damaged by attempts to alter the document, and the damage can be detected even if the damage is not visible to the unaided eye.

Other tests that are or may be performed include reading microchips embedded into a document, and detecting the presence of and reading encoded biographical, biometric, and/or other information present in a document.

After the first test has been performed the program progresses to block 62 where a decision is made of whether or not the first security test was successfully passed. If the first test indicates the document is not authenticated, the program exits block 62 at No to block 65 where the results of the first test are stored. If the first test indicates that the document is authentic, or after a non-authentic indication has been stored at block 65, the program progresses to block 63 where it is determined if all security tests identified at block 60 have been performed. If the determination at block 63 is No, the program progresses to block 64 and performs the next security test. The order that security tests are performed is determined by the program. The results of the next security test are stored at block 65 and the program returns to block 63 and determines if there are more security tests to be performed as described above. While it is preferred that all security tests be performed, testing may be halted after a single test indicating an altered or counterfeit document.

A final test that can be performed, when equipment is networked together with a central computer and database (not shown), is to check to see if the bearer of a document is on a watch list, such as a prohibited entry list. Such other lists may include those wanted for a crime. The prohibited entry or other lists may be loaded into equipment 10, or may be accessed at the central computer and database via network port 21 (FIG. 1). After comparison against the prohibited list(s), a determination is made whether or not the bearer of document 11 is on a prohibited or other list. If it is determined that the bearer of document 11 is on a prohibited or other list, more detail may be provided on display 20 as to what list the document bearer is on.

If the determination at block 63 is Yes, the program progresses to block 66 where a determination is made, based on the results of the security testing, whether or not the identified document type used to identify the tests performed, is believed to be proper. If the determination made at block 66 is No, indicating that no counterfeiting or alterations are detected, and document 11 is determined to be good, the program progresses to block 68 and the results of the security testing are displayed. The display may be an LED that is lit or not lit indicating the pass or fail determination, or a more detailed visual display may be provided detailing what tests indicated a non-validated document. The results of the security testing are then stored at block 69 and used at block 70 to develop a histogram of the types of documents that are read and validated using a particular piece of equipment 10. For example, at an international airport, the histogram should predictably show that passports are the most common document type read and validated.

Upon all document security testing being completed and the results reported at block 68, at optional block 71, some or all the security testing results and data read from a document may be transferred via network port 21 (FIG. 1) to a central database (not shown) for storage. Records are thus kept of use of a document, and the information may be used to analyze the security testing to improve same.

If the determination made at block 66 is Yes, the program returns to block 60 and the security tests to be performed for the identified document type that has the second highest overall comparison result at block 37 in FIG. 2 are retrieved from memory 22. The security testing described above with reference to FIG. 3 is then repeated. This cycle continues as long as the program running in CPU 19 is unsure that the results of security testing are valid.

FIG. 4 is a block diagram expanding the operation of block 35 shown in FIG. 2. As previously described for block 35, the first document image is processed to retrieve document format data used to identify the document type. At block 73, the first image is divided into an X,Y array of pixels in a manner well known in the art. However, comparing individual pixels of the first image with a like number of pixels of a stored, pixelized version of a document type is a very computer intensive task and is not done in the preferred embodiment of the invention in order to speed document processing. In the preferred embodiment of the invention, at block 74 the first image is partitioned into a number of segments each containing a number of pixels. A characteristic of each segment is then used to determine a correlation number for the segment, and many different types of characteristics may be used for this purpose. For instance, the pixels in each segment may be processed to produce a grey scale value for each segment. The same grey scale information is contained in the corresponding segment of the stored, reference document type information and the two grey scale values for the corresponding segments are compared to produce a correlation number or comparison result and, if desired, an overall comparison result or correlation number of all segments in a document may be calculated. Also, color in a segment, such as document background color, or the number of edges in a segment image may be used for the comparison. In addition, combinations of these and other unnamed characteristics may be used in processing different segments of a single document. By comparing such characteristics for a small number of segments, versus a large number of pixels, the document type identification process is simplified and speeded up.

To perform the segment comparisons described in the previous paragraphs, a mask is also stored with the characteristics of each document type. The mask excludes areas (segments) on a document that contain "dynamic" information such as the document bearer's name, and includes areas (segments) on a document that contain "static" information such as the identity of the state or agency that issued the document. Using the mask at block 76, only document segments which have static information therein are used in the comparison process. This simplifies and speeds up the document type identification process.

While what has been described herein is the preferred embodiment of the invention, it will be obvious to those skilled in the art that numerous changes may be made without departing from the spirit and scope of the invention. For example, the order of comparison for document attributes may be changed. Also, different visible and invisible light sources may be added and utilized as new security materials and anti-counterfeiting measures are developed. Further, as new types of information are added to documents, the analysis program may be modified to read and analyze such new types of information. An example of such new type of information may be data giving spacing between facial features, such as mean distance between eyes. Also, micro-miniature electronic devices may be embedded into documents, and these devices may be read and/or actuated to read and/or verifying the documents. Such micro-miniature electronic devices are already known and used in "smart cards".

What is claimed is:

1. A method for reading and authenticating documents to determine if they are genuine, counterfeit, or if they have been altered, each document type having a number of attributes, said method comprising the steps of:

partitioning a reference document, for each document type that is to be read and authenticated, into a number of segments each containing a number of pixels;

determining a correlation number for each reference document segment based on a characteristic of the segment;

analyzing a first image of a first document for a first attribute that is then used to identify all possible document types that have the first attribute;

partitioning the first image of the first document into a number of segments each containing a number of pixels, the location and size of the first document segments being the same as the reference documents that have the same first attribute;

determining a correlation number for first selected segments of the first document image based on a characteristic of the first selected segments that is identical to the same characteristic in the corresponding segments of the reference documents that have the same first attribute as the first document;

comparing the correlation number for each first selected segment of the first document with the correlation number of the corresponding segments of the reference documents that have the same first attribute as the first document; and identifying the document type of the first document based on the value of the correlation numbers.

2. The method in accordance with claim 1 wherein each document type has specified areas thereon in which is static information that does not change, the static information for all document types is stored for use in performing the steps of claim 1, wherein each document type has specified areas thereon in which is dynamic information that changes from document to document, and wherein the first selected segments in the first document contain static information.

3. The method in accordance with claim 2 wherein the attributes of each document type are used to determine if the first document is genuine, counterfeit, or has been altered and further comprising the step of:

analyzing the image of the first document using attributes for the identified document type to determine if the first document is genuine, counterfeit, or has been altered.

4. The method in accordance with claim 3 further comprising the steps of:

obtaining selected further image(s) of the first document only as needed to authenticate the first document; and analyzing the selected further image(s) of the first document using attributes for the identified document type to determine if the first document is genuine, counterfeit, or has been altered.

5. The method in accordance with claim 4 further comprising the steps of:

reading information from segments of the identified first document that contain dynamic information;

using the dynamic information read from the first document to determine if any action should be taken with respect to a person bearing the first document.

6. The method in accordance with claim 5 wherein the characteristics of different segments of the document types and the first document can be different.

7. The method in accordance with claim 6 further comprising the step of masking out second selected segments of the first image when determining a correlation number for the first selected segments of the first document image.

8. The method in accordance with claim 7 wherein, in the step of masking out second selected segments of the first image, it is dynamic information that is masked out when determining a correlation number for the first selected segments of the first document image.

9. The method in accordance with claim 7 further comprising the step of:

assigning a weighting factor to each first selected segment of the first image, the weighting factors affecting the value of the correlation number for each first selected segment.

10. The method in accordance with claim 2 further comprising the steps of:

reading information from second selected segments of the identified first document that contain dynamic information;

using the dynamic information read from the first document to determine if any action should be taken with respect to a person bearing the first document.

11. The method in accordance with claim 10 wherein the attributes of each document type are used to determine if the first document is genuine, counterfeit, or has been altered and further comprising the step of:

analyzing the image of the first document using attributes for the identified document type to determine if the first document is genuine, counterfeit, or has been altered.

12. The method in accordance with claim 2 wherein the characteristics of different segments of the document types and the first document can be different.

13. The method in accordance with claim 12 further comprising the step of masking out the segments of the first image that contain dynamic information when determining a correlation number for the first selected segments of the first document image that contain static information.

14. The method in accordance with claim 13 wherein the attributes of each document type are used to determine if the first document is genuine, counterfeit, or has been altered and further comprising the step of:

analyzing the image of the first document using attributes for the identified document type to determine if the first document is genuine, counterfeit, or has been altered.

15. The method in accordance with claim 2 further comprising the step of masking out selected second segments of the first image when determining a correlation number for the first selected segments of the first document image.

16. The method in accordance with claim 15 wherein in the step of masking out second selected segments of the first image, it is dynamic information that is masked out when determining a correlation number for the first selected segments of the first document image.

17. The method in accordance with claim 15 further comprising the step of:

assigning a weighting factor to each first selected segment of the first image, the weighting factors affecting the value of the correlation number for each first selected segment.

18. The method in accordance with claim 1 further comprising the step of masking out second selected segments of the first image when determining a correlation number for the first selected segments of the first document image.

19. The method in accordance with claim 1 wherein the characteristics of different segments of the document types and the first document can be different.

20. The method in accordance with claim 1 wherein each document type has a specific set of attributes, and ones of the attributes of each document type are used to determine if the first document is genuine, counterfeit, or has been altered and further comprising the step of:

analyzing the image of the first document using attributes for the identified document type to determine if the first document is genuine, counterfeit, or has been altered.

21. The method in accordance with claim 1 further comprising the steps of:

obtaining selected further image(s) of the first document only as needed to authenticate the first document; and analyzing the selected further image(s) of the first document using attributes for the identified document type to determine if the first document is genuine, counterfeit, or has been altered.

22. The method in accordance with claim 1 further comprising the step of:

assigning a weighting factor to each first selected segment of the first image, the weighting factors affecting the value of the correlation number for each first selected segment.

* * * * *